(No Model.)

H. E. REEVE.
DRILLING APPARATUS.

No. 545,611. Patented Sept. 3, 1895.

Witnesses:
J. Staib
Chas. H. Smith

Inventor:
Henry E. Reeve
per Lemuel W. Serrell
Atty.

UNITED STATES PATENT OFFICE.

HENRY E. REEVE, OF BROOKLYN, NEW YORK.

DRILLING APPARATUS.

SPECIFICATION forming part of Letters Patent No. 545,611, dated September 3, 1895.

Application filed December 31, 1894. Serial No. 533,446. (No model.)

*To all whom it may concern:*

Be it known that I, HENRY E. REEVE, a citizen of the United States, residing at Brooklyn, in the county of Kings and State of New York, have invented an Improvement in Drilling Apparatus, of which the following is a specification.

Drills for boring metal and other articles have heretofore been operated by a vertical spindle driven in some instances by friction, the drill being moved downwardly as the boring progresses. In the present improvement the drill is driven by the friction of a small pulley against the conical surface of a revolving drum, the weight of the spindle causing the surfaces to remain in contact during the drilling operation, and as the drill is raised the spindle also is lifted to separate the frictional surfaces and arrest the rotation of the spindle.

Figure 1:
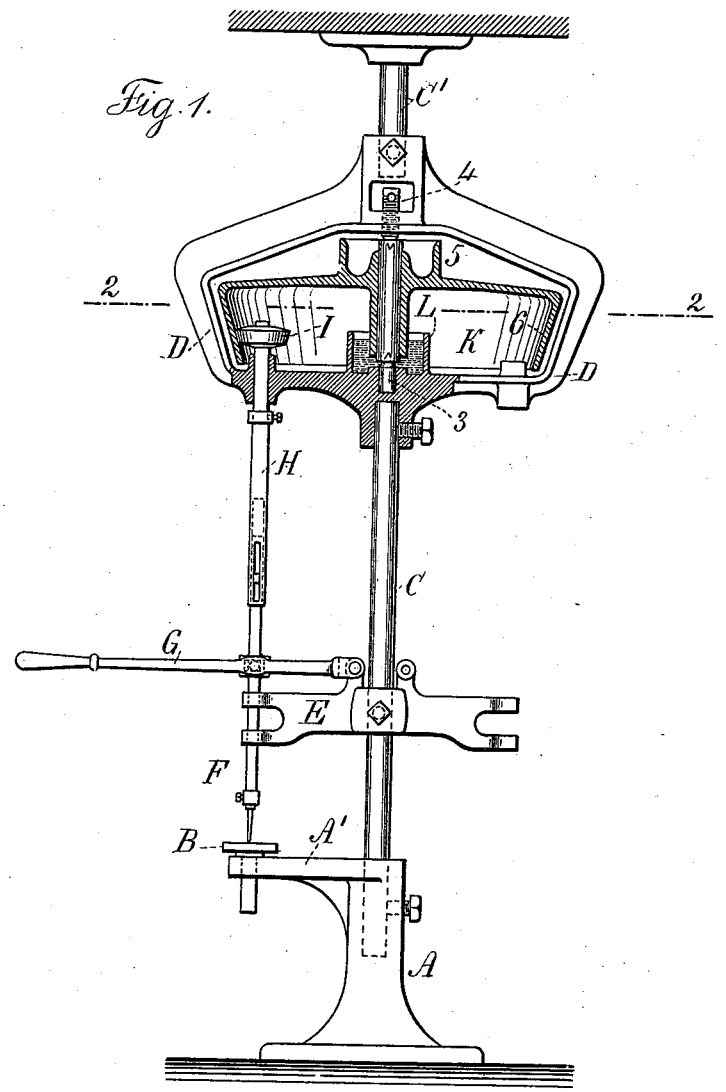
Figure 2:
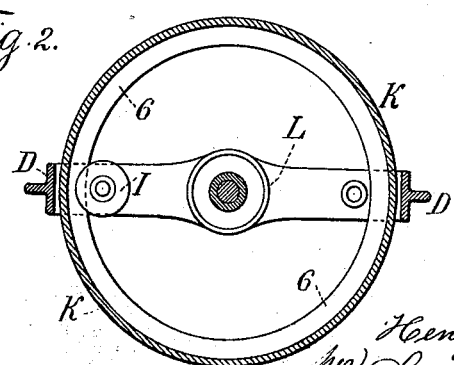

In the drawings, Figure 1 is an elevation of the apparatus with the driving-drum in section, and Fig. 2 is a sectional plan at the line 2 2.

The standard A or base is of any desired size and shape, and the arm A' projects at one side and carries the table B upon which the article to be drilled is supported, and it is usually advantageous to employ a column C, rising from the standard A to the yoke-frame D, the upper end of which may be supported advantageously by a secondary column C', extending from the top of the yoke to a ceiling or beam, so as to support the apparatus firmly, and the arm E upon the column C receives the spindle F, that carries any suitable tool, such as one adapted to drilling or boring, and usually a lever G is made use of for giving end motion to the spindle F, or any other suitable or usual device—such as a screw—may be made use of for giving end motion to the spindle F. The shaft H is made tubular at the lower end for the reception of the spindle F, and there is a cross-pin in a slot in the shaft by which the spindle is driven, and such spindle can receive the desired length of vertical movement by the pin sliding in the slot, and this shaft H passes through a bearing in the yoke-frame D and is provided with a frictional pinion I upon its upper end. The driving-drum K is supported upon suitable centers or bearings in the yoke D. I prefer to employ a fixed lower center 3 and an upper screw-center 4, entering holes at the ends of the shaft of the drum, and it is advantageous to provide an oil-holding vessel L surrounding the lower center 3, so that such center may remain immersed in the lubricating material. The portion 5 of the driving-drum K is adapted to receive a belt, by which such drum is rotated at a proper speed, and the portion 6 of the driving-drum is conical, and the frictional pinion I comes into contact with such conical surface. If the lower end of the conical portion of the driving-drum is the largest, the frictional pinion I will be outside the same. I have, however, shown the lower end of the conical portion of the driving-drum as the smallest, so that such frictional pinion I is within such drum, and the parts are so arranged that when the frictional pinion I is raised the periphery thereof separates from the conical interior surface of the driving-drum, so that the spindle will not be rotated; but when the shaft H and frictional pinion I are allowed to descend such frictional pinion comes into contact with the conical surface and receives rotation from the same by the frictional contact.

From the foregoing it is to be understood that when the lever G or its equivalent is moved so as to raise the spindle F and tool out of action the pin upon the spindle comes in contact with the shaft at the upper end of he slot, and, lifting the shaft H and frictional pinion I, stops the rotation of the tool, and when the reverse movement takes place and the spindle F and tool are brought down into action the frictional pinion I receives its motion from the conical surface of the driving-drum and rotates the boring or other tool, and it will be apparent that the relative speeds of the boring-tool and the driving-drum will depend upon the size of the frictional pinion I to the conical surface of the driving-drum.

More than one tool may be driven from the same driving-drum, and different speeds may be obtained from the same drum by varying the sizes of the frictional pinions. I remark that any suitable bearing may be provided for the shaft H where it passes through or is supported by the yoke D, such bearing being either rigid or movable, as usual in machinery of this character.

In cases where the weight of the shaft and frictional pinion is not sufficient to afford the necessary contact between the frictional surfaces a spring may be added for giving end motion to the shaft.

I do not limit myself to any particular tool to be rotated by this apparatus, as a drill, cutter, or grinding-tool may be connected with the spindle.

I claim as my invention—

1. The combination with the standard, column and yoke frame, of a driving drum having a conical frictional surface, and a belt pulley, a shaft and spindle for the drill or other tool, and means for raising and lowering the same, and a frictional pinion upon the upper end of the shaft adapted to come into contact with the conical surface of the driving drum as the tool, spindle and shaft descend, substantially as set forth.

2. The combination with the standard, column and yoke frame, of a driving drum having a conical frictional surface, an upper and lower center for the shaft of the driving drum, an oil holding vessel around the lower center, a spindle for a boring or other tool, a shaft for driving the same, and a pinion upon the upper end of the shaft and within the conical portion of the driving drum, substantially as set forth.

Signed by me this 28th day of December, 1894.

H. E. REEVE.

Witnesses:
GEO. T. PINCKNEY,
S. T. HAVILAND.